No. 830,235. PATENTED SEPT. 4, 1906.
J. H. KNIGHT.
BALL COCK.
APPLICATION FILED SEPT. 16, 1904.
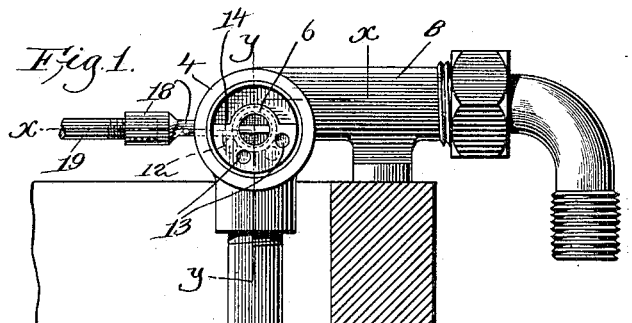
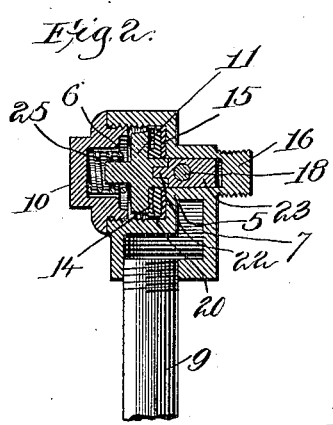
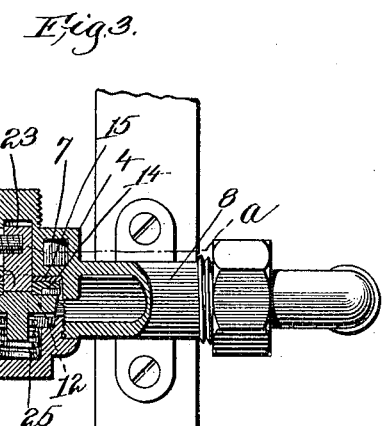
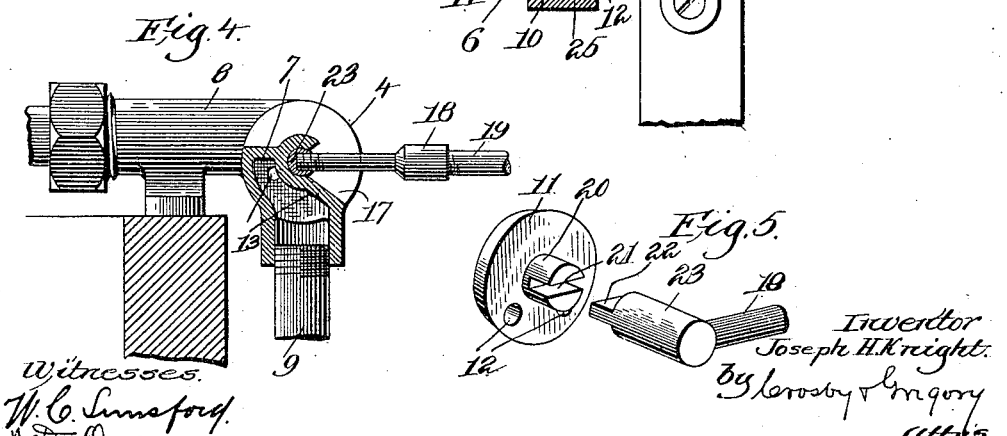
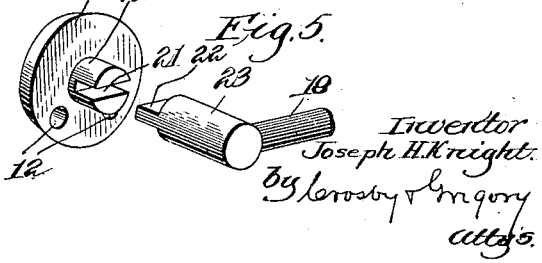
Witnesses.
W. C. Lunsford.
W. D. Owen.
Inventor
Joseph H. Knight.
By Crosby & Gregory
Attys.

UNITED STATES PATENT OFFICE.

JOSEPH H. KNIGHT, OF GARDNER, MASSACHUSETTS, ASSIGNOR TO THE PERFECTO SPECIALTY COMPANY, OF GARDNER, MASSACHUSETTS, A CORPORATION OF MAINE.

BALL-COCK.

No. 830,235.     Specification of Letters Patent.     Patented Sept. 4, 1906.

Application filed September 16, 1904. Serial No. 224,722.

*To all whom it may concern:*

Be it known that I, JOSEPH H. KNIGHT, a citizen of the United States, residing at Gardner, county of Worcester, and State of Massachusetts, have invented an Improvement in Ball-Cocks, of which the following description, in connection with the accompanying drawings, is a specification, like numerals on the drawings representing like parts.

This invention relates to ball-cocks or float-valves for flush-tanks, and has for its object to provide a novel construction of valve which is certain in its action, easily operated, and so constructed that practically no wear occurs between the moving parts.

The valve is of the disk-valve type—that is, one in which the inlet and outlet chambers of the valve-casing are separated by a perforated partition and a disk or flat valve is placed in the inlet-chamber and connected to the float, so that the raising or lowering of the float turns the disk, and thus opens or closes the valve.

In my improved valve the valve-seat is made of some suitable hard-rubber material and the valve itself of a suitable composition—such, for instance, as hard bronze—between which and the valve-seat there is a minimum coefficient of friction.

To effect a tight joint between the valve-seat and the casing-partition on which it rests at a slight cost, I prefer to use a packing for the valve-seat of soft rubber, which will pack firmly against the walls and bottom of the valve-chamber and make a tight joint without the necessity of any machine-work on the interior of the chamber.

The valve-stem projects through the hard-rubber valve-seat and through the partition between the inlet and outlet chambers and has attached to its outer end the arm of the float-valve. In order to permit the valve to seat itself perfectly without regard to the direction in which the strain is brought to bear on the float-arm, I prefer to make said valve-stem in two parts which are so connected together that while they must rotate in unison a slight lateral movement of one with relation to the other is permitted.

The other features wherein my invention resides will be more fully hereinafter described and then pointed out in the claims.

In the drawings, Figure 1 is a side view of my improved valve with the cap for the valve-chamber removed. Fig. 2 is a section on the line *y y*. Fig. 3 is a section on the line *x x*, Fig. 1. Fig. 4 is a section on the line *a a*, Fig. 3; and Fig. 5 is a detail of the valve.

The valve-casing is designated by 4, and it is formed with the perforated partition 5, which divides the casing into an inlet-chamber 6 and an outlet-chamber 7. The inlet-chamber has communication with an inlet-pipe 8 and the outlet-chamber with an outlet-pipe 9. The inlet-chamber, which is also the valve-chamber, is closed by a suitable cap 10, which is preferably made removable, and said chamber contains the disk valve 11. The valve is similar to ordinary disk valves and has one or more apertures 12 therein, which are adapted to register with suitable apertures 13 in the valve-seat and partition when the valve is to be opened. The valve-seat is designated by 14 and is of hard rubber or similar material which has a minimum amount of coefficient of friction with the composition valve 11.

In order to effect a tight joint between the valve-seat 14 and the bottom of the inlet-chamber 6 in a simple and effective manner, I use a packing-disk 15, of soft rubber, which is crowded into the bottom of the chamber and against which the hard-rubber valve-seat 14 rests. Said packing member 15 makes a perfectly-tight joint between the valve-seat and the partition 5 without the necessity of machining said partition or the interior of said inlet-chamber. In practice I propose to cement or otherwise secure together the packing member 15 and the valve-seat 14 and then to crowd the soft-rubber packing member hard into the valve-chamber. The material of which the packing member is made is such that when it is crowded into place it will adhere to the face of the partition, and thus firmly hold the valve-seat in place. Said packing member 15 therefore acts both to pack the valve-stem and prevent leakage and to firmly hold the valve-seat in place.

The valve-stem projects through the valve-seat 14 and packing member 15 and also through the partition 5 and into a hub or boss 16, in which it rotates. Said hub or boss has a lateral opening 17 therein, through which the end 18 of the float-valve stem 19 projects, said end being suitably secured to the valve-stem.

The outlet-chamber 7, it will be seen, is in the same vertical plane as the float-valve stem 19 and extends part way round the hub 16. Said chamber may be extended sufficiently around the hub so that the end walls of the chamber form the stops to limit the swinging movement of the stem 19, or said chamber may have a less extent and the swinging movement of said stem be limited by the walls of the opening 17, as seen in the drawings.

In order to insure that the valve-disk 11 shall always be firmly seated on the valve-seat 14, I prefer to make the valve-stem in two parts, so that the valve-disk itself may have a slight movement relative to the portion of the valve-stem to which the arm 19 is secured.

In the form of the invention herein shown one portion 20 of the valve-stem is rigid with the valve-disk 11 and is provided with a suitable slot 21, in which a tongue 22 on the other part 23 of the valve-stem is received. The part 23 of the valve-stem is partly journaled in the hub 16 and has the end 18 of the arm 19 secured thereto. With this construction the two parts of the valve-stem must rotate together, and hence the swinging movement of the arm 19 causes the valve to turn; but the valve-disk itself is permitted to have sufficient lateral motion to seat itself perfectly regardless of any strains which may be brought on the arm 19.

The valve is preferably held to its seat by means of a suitable spring 25.

Although the form of my invention herein illustrated is that preferred by me, yet I do not limit myself to the exact construction shown, as various changes in the details and arrangement of the various parts may be made without departing from the invention.

Having described my invention, what I claim as new, and desire to secure by Letters Patent, is—

1. In a float-actuated ball-cock, a valve-casing having suitable inlet and outlet openings, a perforated partition in said casing dividing the same into two chambers, one being the receiving and the other the delivery chamber, a suitable valve-seat upon said partition, a disk valve removably mounted within the receiving-chamber, said valve being provided with an axially-placed slotted stud which is adapted to coöperate with the valve-stem proper, a valve-stem to which is connected the float-arm, said valve-stem being housed within a cylindrical boss, said boss being mounted upon the exterior of the valve-casing.

2. In a float-actuated ball-cock, a valve-casing having suitable inlet and outlet openings, said casing comprising a cylindrical receiving-chamber and a segmental delivery-chamber, a segment of one of the circular faces of the receiving-chamber being adapted to form a partition between the receiving and delivery chambers, such partition being perforated, a perforated valve-seat within said receiving-chamber, the perforations of the said seat being adapted to register with the perforations in the aforesaid partition, an elastic packing-disk, also perforated, attached to said valve-seat, said packing-disk having a diameter greater than the diameter of the bottom of the receiving-chamber whereby, when the said packing-disk is crowded into its operative position, it will both serve to pack the valve-seat and to securely hold the same in place, and a disk valve within said receiving-chamber adapted to coöperate with said perforations in the valve-seat whereby communication is established between the receiving and delivery chambers 3. In a float-actuated ball-cock, a valve-casing having suitable inlet and outlet openings, said casing comprising a cylindrical receiving-chamber and a segmental delivery-chamber, said delivery-chamber constituting a prolongation of the receiving-chamber, a segment of one of the circular faces of the receiving-chamber forming a partition between the two chambers and such partition being perforated, a disk valve mounted within the receiving-chamber and adapted to coöperate with the perforations of the partition, said valve being adapted to be operated by a float-arm which is connected to the valve-stem, said valve-stem being housed within a slotted cylindrical boss, said boss extending from the exterior of the valve-casing and one wall of the said slot forming a limit-stop for the movement of the float-arm in one direction whereas the exterior wall of the delivery-chamber serves as a limit-stop for the same in the opposite direction.

4. In a float-actuated ball-cock, a valve-casing having suitable inlet and outlet openings, said casing comprising a cylindrical receiving-chamber and a segmental delivery-chamber, a segment of one of the circular faces of the receiving-chamber being adapted to form a partition between the receiving and delivery chambers, such partition being perforated and a disk valve within said receiving-chamber adapted to coöperate with said perforations, said valve having an axially-placed slotted stud, said slotted stud being adapted to coöperate with a valve-stem, said valve-stem being housed in a cylindrical boss formed upon the exterior of the casing, said boss being provided with a circumferentially-disposed slot in which plays the float-arm and having its exterior end closed whereby when the float-arm is disconnected the casing may be turned in various positions without altering the relative positions of the valve and valve-stem.

In testimony whereof I have signed my name to this specification in the presence of two subscribing witnesses.

JOSEPH H. KNIGHT.

Witnesses:
   JOSEPH P. CARNEY,
   MARY K. LEAMY.